(12) United States Patent
Huang et al.

(10) Patent No.: US 7,328,202 B2
(45) Date of Patent: Feb. 5, 2008

(54) SYSTEM AND METHOD FOR SOFTWARE ESTIMATION

(76) Inventors: Xishi Huang, 271L Windermere Road, London, Ontario (CA) N6G 2J7; Danny Siu Kau Ho, 273 Weldrick Road East, Richmond Hill, Ontario (CA) L4C 0A6; Jing Ren, 271L Windermere Road, London, Ontario (CA) N6G 2J7; Luiz F. Capretz, 104 Hesketh Street, London, Ontario (CA) N6G 5H5

( * ) Notice: Subject to any disclaimer, the term of this patent is extended or adjusted under 35 U.S.C. 154(b) by 403 days.

(21) Appl. No.: 10/920,236

(22) Filed: Aug. 18, 2004

(65) Prior Publication Data

US 2006/0041857 A1    Feb. 23, 2006

(51) Int. Cl.
*G06F 9/44* (2006.01)
(52) U.S. Cl. .............. 706/52; 706/2; 706/15
(58) Field of Classification Search ............ 706/52, 706/2, 15
See application file for complete search history.

(56) References Cited

U.S. PATENT DOCUMENTS

| | | | | |
|---|---|---|---|---|
| 5,524,176 | A * | 6/1996 | Narita et al. ............... | 706/2 |
| 5,819,242 | A * | 10/1998 | Matsuoka et al. ............ | 706/2 |
| 6,317,730 | B1 * | 11/2001 | Neuneier et al. ............ | 706/2 |
| 6,446,054 | B1 * | 9/2002 | Mayorga Lopez ............ | 706/2 |
| 6,748,369 | B2 * | 6/2004 | Khedkar et al. ............. | 706/6 |
| 2002/0091994 | A1 | 7/2002 | McCready et al. | |
| 2003/0018952 | A1 | 1/2003 | Roetzheim | |
| 2003/0023470 | A1 | 1/2003 | Labbi | |
| 2003/0037063 | A1 * | 2/2003 | Schwartz ................. | 707/104.1 |
| 2003/0070157 | A1 | 4/2003 | Adams et al. | |
| 2003/0074291 | A1 | 4/2003 | Hartung et al. | |
| 2003/0097308 | A1 | 5/2003 | Connors et al. | |
| 2003/0149676 | A1 * | 8/2003 | Kasabov ................. | 706/2 |
| 2003/0188290 | A1 | 10/2003 | Corral | |
| 2003/0204346 | A1 | 10/2003 | Kennedy et al. | |
| 2005/0119986 | A1 * | 6/2005 | Panfilov et al. ............ | 706/59 |
| 2005/0149459 | A1 * | 7/2005 | Kofman et al. ............ | 706/2 |

FOREIGN PATENT DOCUMENTS

| | | |
|---|---|---|
| CA | 2209263 | 12/1998 |
| CA | 2308221 | 5/1999 |

OTHER PUBLICATIONS

Saliu, M. O., Ahmed, M. A. and AlGhamdi, J. S.: "Towards Adaptive Soft Computing Based Software Effort Prediction", in proceedings of the North American Fuzzy Information Processing Society Conference (NAFIPS 2004), IEEE Computers, Jun. 27-30, 2004, Banff, Alberta, Canada, pp. 16-21. ieeexplore.ieee.org/iel5/9281/29474/01336241.pdf.*

(Continued)

*Primary Examiner*—David Vincent
*Assistant Examiner*—Lut Wong
(74) *Attorney, Agent, or Firm*—Bereskin & Parr

(57) ABSTRACT

A system and method for software estimation. In one embodiment, the software estimation system comprises a pre-processing neuro-fuzzy inference system used to resolve the effect of dependencies among contributing factors to produce adjusted rating values for the contributing factors, a neuro-fuzzy bank used to calibrate the contributing factors by mapping the adjusted rating values for the contributing factors to generate corresponding numerical parameter values, and a module that applies an algorithmic model (e.g. COCOMO) to produce one or more software output metrics.

14 Claims, 6 Drawing Sheets

OTHER PUBLICATIONS

Satish Kumar, B. Ananda Krishna and Prem S. Satsangi "Fuzzy Systems and Neural Networks in Software Engineering Project Management" Journal of applied Intelligence, 1994 http://www.springerlink.com/content/n7x1225557k55386/.*

Zhiwei Xu, a and T.M.Taghi M. Khoshgoftaar ("Identification of Fuzzy models of software cost estimation" Fuzzy Sets and System 145, 2004) http://dx.doi.org/10.1016/j.fss.2003.10.008.*

Sung-Kwun Oh Pedrycz, W. Byoung-Jun Park "Self-Organizing Neurofuzzy Networks Based on Evolutionary Fuzzy Granulation" IEEE Transactions on Systems, Man and Cybernetics, Part A, Mar. 2003 vol. 33, Issue 2: 271-277 http://ieeexplore.ieee.org/xpls/abs_all.jsp?arnumber=1219465.*

W. Pedrycz ("Computational Intelligence and visual computing: an emerging technology for software engineering" Springer-Verlag 2002) www.springerlink.com/index/86KMB5KVHRLM8669.pdf.*

Xiaoqing Liu Kane, G. Bambroo, M. "An Intelligent Early Warning System for Software Quality Improvement and Project Management" 15th IEEE International Conference on Tools with Artificial Intelligence, 2003. Proceedings. Publication Date: Nov. 3-5, 2003 On pp. 32-38 http://ieeexplore.ieee.org/iel5/8840/27974/01250167.pdf.*

Briand, L. C., Emam, K. E. and Maxwell, K. D. (1999) 'An assesement and comparison of common software cost estimation modeling techniques', in Proceedings of the 21st international conference on Software engineering, Los Angeles, CA, May 1999.

Chulani, S., Boehm, B. and Steece, B. (1999) Bayesian analysis of empirical software engineering cost models, IEEE Transactions on Software Engineering, 25(4), 573-583.

Dote, Y. and Ovaska, S. J.(2001) 'Industrial applications of soft computing: a review', Proceedings of the IEEE, 89(9), 1243-1265.

Finnie, G. R., Wittig, G. E., and Desharnais, J-M. (1997) 'A comparison of software effort estimation techniques: using function points with neural networks, case-based reasoning and regression models', Journal of Systems and Software, 39(3), 281-289.

Gray, A.R. (1999) 'A simulation-based comparison of empirical modeling techniques for software metric models of development effort', in Proc. of the 6th International Conference on Neural Information Processing ICONIP'99, Perth, WA, Australia, vol. 2, 526-531.

Gray, A. and MacDonell, S. (1997a) 'A comparison of techniques for developing predictive models of software metrics', Information and Software Technology, 39(6), 425-437.

Gray, A. and MacDonell, S. (1997b) 'Applications of fuzzy logic to software metric models for development effort estimation', in Proc. of the 1997 Annual Meetings of the North American Fuzzy Information Processing Society—NAFIPS, Syracuse NY, USA, 394-399.

Gray, A. and MacDonell, S. (1999) 'Fuzzy logic for software metric models throughout the development life-cycle', In Proc. of the 18th International Conference of the North American Fuzzy Information Processing Society—NAFIPS, New York NY, USA, 258-262.

Idri, A., Kjiri, L. and Abran, A. (2000) 'COCOMO cost model using fuzzy logic', in Proc. 7th International Conference on Fuzzy Theory & Technology, Atlantic City, NJ, USA, 1-4.

Idri, A., Khoshgoftaar, T.M. and Abran, A. (2002) 'Can neural networks be easily interpreted in software cost estimation?', in Proceedings of the 2002 IEEE International Conference on Fuzzy Systems, vol. 2, 1162-1167.

Jang, R. J. S. (1993) 'ANFIS: adaptive-network-based fuzzy inference system', IEEE Trans. Systems, Man, and Cybernetics, 23(3), 665-685.

MacDonell, S. and Gray, A. (1997) 'A comparison of modeling techniques for software development effort prediction', in Proceedings of the 1997 International Conference on Neural Information Processing and Intelligent Information Systems, Springer-Verlag, pp. 869-872.

MacDonell, S.G., Gray, A.R. and Calvert, J.M (1999a) 'FULSOME: fuzzy logic for software metric practitioners and researchers', in Proc. of the 6th International Conference on Neural Information Processing ICONIP'99, Perth, WA, Australia, vol. 1, 308-313.

MacDonell, S.G., Gray, A.R. and Calvert, J.M (1999b) 'FULSOME: a fuzzy logic modeling tool for software metricians', in Proc. of the 18th International Conference of the North American Fuzzy Information Processing Society—NAFIPS, New York NY, USA, 263-267.

Madachy, R.J., "Heuristic risk assessment using cost factors", IEEE Software, vol. 14, No. 3, pp. 51-59, May/Jun. 1997.

Maxwell, K.D. and P. Forselius, "Benchmarking software development productivity", IEEE Software, vol. 17, No. 1, pp. 80-88, Jan./Feb. 2000.

Mitra, S. and Hayashi, Y. (2000) 'Neuro-fuzzy rule generation: survey in soft computing framework', IEEE Trans. on Neural Networks, 11(3), 748-768.

Oh, Sung-Kwun et al., "Self-Organizing Neurofuzzy Networks Based on Evolutionary Fuzzy Granulation", IEEE Transactions on Systems, Man, and Cybernetics—Part A: Systems and Humans, vol. 33, No. 2, Mar. 2003, pp. 271-277.

Shepperd M. and Schofield, M. (1997) 'Estimating software project effort using analogies', IEEE Transactions on Software Engineering, 23(12), 736-743.

Wittig, G. and Finnie, G. (1997) 'Estimating software development effort with connectionist models', Information and Software Technology, 39(7), 469-476.

Ho, Danny (1996) 'Experience report on COCOMO and the Costar tool from Nortel's Toronto Laboratory', in Eleventh International Forum on COCOMO and Software Cost Modeling, University of Southern California, Los Angeles.

Panlilio-Yap, Nikki and Ho, Danny (1994) 'Deploying software estimation technology and tools: the IBM SWS Toronto Lab experience', in Ninth International Forum on COCOMO and Software Cost Modeling, University of Southern California, Los Angeles.

Sheppard, Martin and Kadoda, Gada, "Comparing software prediction techniques using simulation", IEEE Transactions on Software Engineering, vol. 27, No. 11, pp. 1014-1022, Nov. 1999.

Boehm, B.W. et al., Software Cost Estimation with COCOMO II, Prentice Hall PTR, Upper Saddle River, New Jersey, pp. 69, 71-74.

Boehm, B. (1981) Software Engineering Economics, Prentice-Hall, Inc., Englewood Cliffs, New Jersey, pp. 496-499.

Maxwell, K.D., (2002) Applied Statistics for Software Managers, Prentice Hall PTR, Upper Saddle River, pp. 321-323.

Fuller, R., (2000) Introduction to Neuro-Fuzzy Systems, Physica-Verlag, Heidelberg, pp. 171-173.

\* cited by examiner

SYSTEM AND METHOD FOR SOFTWARE ESTIMATION

FIELD OF THE INVENTION

The invention relates generally to software estimation techniques. More specifically, the invention is directed to a novel and inventive system and method for computing output metrics indicative of the cost, quality, size, or other characteristic of a software development project.

BACKGROUND OF THE INVENTION

Software estimation, which can include cost estimation, quality estimation, size estimation, or investment risk estimation, for example, is a major issue in software project management faced by many organizations. In this regard, there is a need for software estimation models that will facilitate effective monitoring, control, and assessment of software development projects.

However, achieving accurate software estimation is inherently a daunting task. The software estimation problem is highly complex, particularly since the relationships between software output metrics and contributing factors generally exhibit strong, complex, non-linear characteristics. Accurate software estimation also typically requires the consideration of many factors, some of which can be difficult to quantify. Prior art approaches used to solve this problem have not been widely successful in effectively and consistently predicting software output metrics.

One example of a well-known software cost estimation model is the Constructive Cost Model (COCOMO), which integrates expert knowledge. This model is considered to be generally simple, in that it does not require the use of complex mathematics in the estimation process. However, it is also one example of several known models that rely heavily on the availability of sufficient historical project data to be effectively employed, which is not always readily available.

More recently, techniques based on artificial neural networks have been applied to solve the software estimation problem. However, such techniques have not been widely accepted by software engineering practitioners. While artificial neural networks (ANNs) have the ability to model complex, non-linear relationships, and are capable of approximating measurable functions through learning, ANNs generally operate as "black boxes". Accordingly, known ANN-based models do not provide an explicit explanation of how results are obtained. This lack of transparency may be one of the primary reasons that such techniques have not gained wide acceptance among software engineering practitioners.

Fuzzy logic techniques have been applied to software estimation problems to a limited extent. Fuzzy logic can be a powerful technique used to solve real world applications with imprecise and uncertain information, and in dealing with semantic knowledge. It is also generally easily understood and interpreted. However, fuzzy-logic based models traditionally do not have learning ability, and the quality of the results obtained when applied to software estimation problems have not, in general, compared favorably to results obtained from applications of more conventional models, such as COCOMO.

SUMMARY OF THE INVENTION

Embodiments of the invention relate generally to a novel and inventive software estimation model and framework that address at least some of the disadvantages of known techniques. In particular, at least some embodiments of the invention are directed to a system and method for software estimation that makes improved use of both numerical project data and available expert knowledge, by uniquely combining certain aspects of relatively newer software estimation techniques (e.g., neural networks and fuzzy logic) with certain aspects of more conventional software estimation models (e.g. COCOMO), to produce more accurate estimation results.

Furthermore, the software estimation model provides a good degree of interpretability. For example, in one embodiment of the invention, fuzzy rules are used, in order to better simulate a software engineering practitioner's line of thought when performing software estimation.

In one broad aspect of the invention, there is provided a software estimation system for use in software engineering, comprising: at least one neuro-fuzzy component, wherein each neuro-fuzzy component implements a plurality of fuzzy rules, and wherein the at least one neuro-fuzzy component takes as input a plurality of contributing factor ratings and processes the contributing factor ratings in accordance with the fuzzy rules to compute numerical parameters for an algorithmic model; and an algorithmic model module coupled to the at least one neuro-fuzzy component, wherein the module takes as input the numerical parameters and processes the numerical parameters in accordance with the algorithmic model to compute one or more software output metrics; wherein each output metric provides an estimate of a characteristic associated with a software development project.

In another broad aspect of the invention, the at least one neuro-fuzzy component of the software estimation system comprises: a neuro-fuzzy inference system for resolving the effect of dependencies among a plurality of contributing factors associated with the plurality of contributing factor ratings, wherein the neuro-fuzzy inference system implements a first subset of the plurality of fuzzy rules, and wherein the neuro-fuzzy inference system takes as input the plurality of contributing factor ratings and processes the contributing factor ratings in accordance with the first subset to compute a plurality of adjusted ratings; and a neuro-fuzzy bank coupled to the neuro-fuzzy inference system, wherein the neuro-fuzzy bank implements a second subset of the plurality of fuzzy rules, and wherein the neuro-fuzzy bank takes as input the plurality of adjusted ratings and processes the adjusted ratings in accordance with the second subset to compute the numerical parameters.

BRIEF DESCRIPTION OF THE DRAWINGS

For a better understanding of various embodiments described herein by way of example, reference will be made to the accompanying drawings in which.

DETAILED DESCRIPTION OF THE INVENTION

Embodiments of the invention relate generally to a novel and inventive software estimation model and framework, applicable to various applications such as cost estimation, quality estimation, risk analysis, size estimation, effort estimation, and other estimation problems. Validated results have shown that this framework can greatly improve estimation accuracy. In addition, embodiments of the invention generally provide learning ability, integration capability of expert knowledge and project data, good interpretability, and robustness to imprecise and uncertain inputs.

In accordance with one broad aspect of the invention, there is provided a system and method for software estimation that combines a neuro-fuzzy technique with at least one algorithmic model. The general architecture of the framework is inherently independent of the choice of algorithmic model and the nature of the estimation problem being considered, and can be applied to a wide variety of estimation problems.

In one embodiment of the invention, the software estimation system comprises a pre-processing neuro-fuzzy inference system used to resolve the effect of dependencies among contributing factors to produce adjusted rating values for the contributing factors, a neuro-fuzzy bank used to calibrate the contributing factors by mapping the adjusted rating values for the contributing factors to generate corresponding numerical parameter values, and a module that takes the numerical parameter values as input and applies an algorithmic model to produce one or more software output metrics.

A software output metric produced by the software estimation system will be indicative of the cost, quality, size, or other characteristic of a software development project, depending on the particular algorithmic model employed. For instance, in one example implementation, COCOMO, a model for cost estimation, may be used as the algorithmic model. Software output metrics computed in accordance with embodiments of the invention may be useful for more effectively managing software development projects and significantly reducing associated investment risk, as embodiments of the invention serve to more effectively analyze the feasibility of such projects in comparison to known methods.

Figure 1:
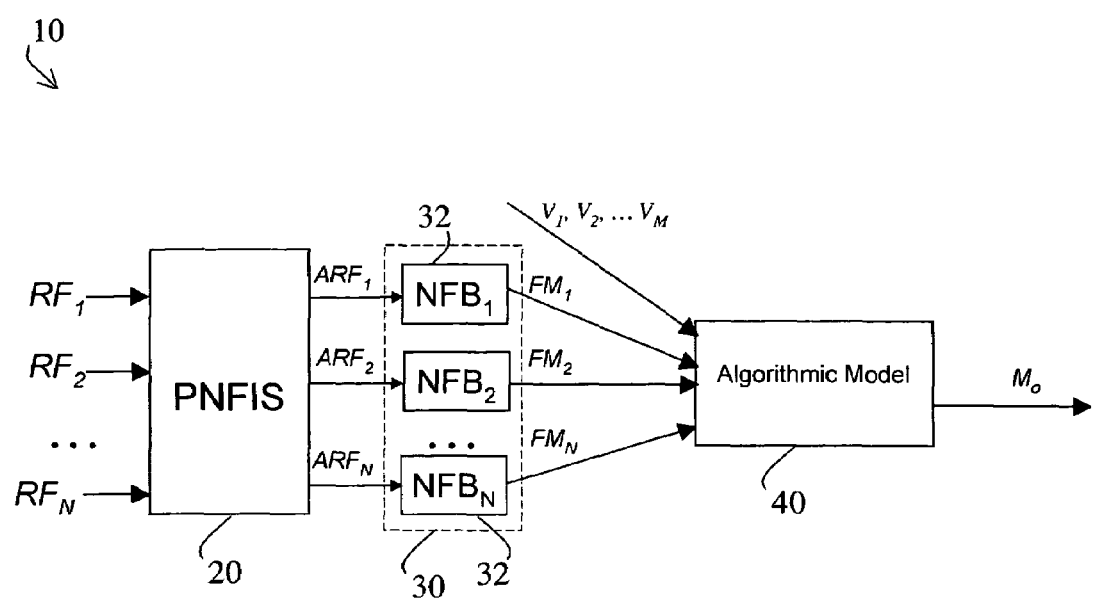
FIG. 1 is a schematic diagram illustrating components in a software estimation system in an embodiment of the invention.

Referring now to FIG. 1, a schematic diagram illustrating components in a software estimation system in an embodiment of the invention is shown generally as 10. In this embodiment of the invention, software estimation system 10 is a computer-implemented system that comprises three primary data processing components: a pre-processing neuro-fuzzy inference system 20 ("PNFIS"), a neuro-fuzzy bank 30 ("NFB"), and an algorithmic model module 40.

As will be described in greater detail herein, in FIG. 1, N is the number of contributing factors, M is the number of other variables (e.g. size) in the algorithmic model, RF is a contributing factor rating, ARF is an adjusted contributing factor rating, NFB is a neuro-fuzzy bank, FM is a numerical parameter value generated by the neuro-fuzzy bank for input to the algorithmic model, V is an input to the algorithmic model, and $M_o$ is at least one output metric.

A contributing factor may be broadly defined as any factor that contributes to software output metrics. Contributing factors may include product, computer, project, and personnel attributes, for example. The specific contributing factors employed in generating a given software output metric will generally depend on the specific algorithmic model used. To evaluate the contribution to the software development project of a particular contributing factor, a rating value can be associated with that contributing factor. In this regard, the rating value can be a numerical value defined on a continuous scale, or a qualitative rating level expressed in linguistic terms. Not all rating levels need be valid for each contributing factor.

In many model-based software estimation approaches, it is assumed that the effects of contributing factors on an estimated software output metric are independent, as between contributing factors. However, this assumption does not hold true for all models in all situations. Accordingly, PNFIS 20 not only encodes expert knowledge into fuzzy if-then rules, but also resolves the effect of dependencies between contributing factors in producing adjusted rating values for the contributing factors. More specifically, PNFIS 20 takes a set of contributing factor ratings $RF_i$ as input, and produces a set of corresponding adjusted ratings for the contributing factors $ARF_i$ as output, which take into account the effect of interdependencies between contributing factors.

Figure 2:
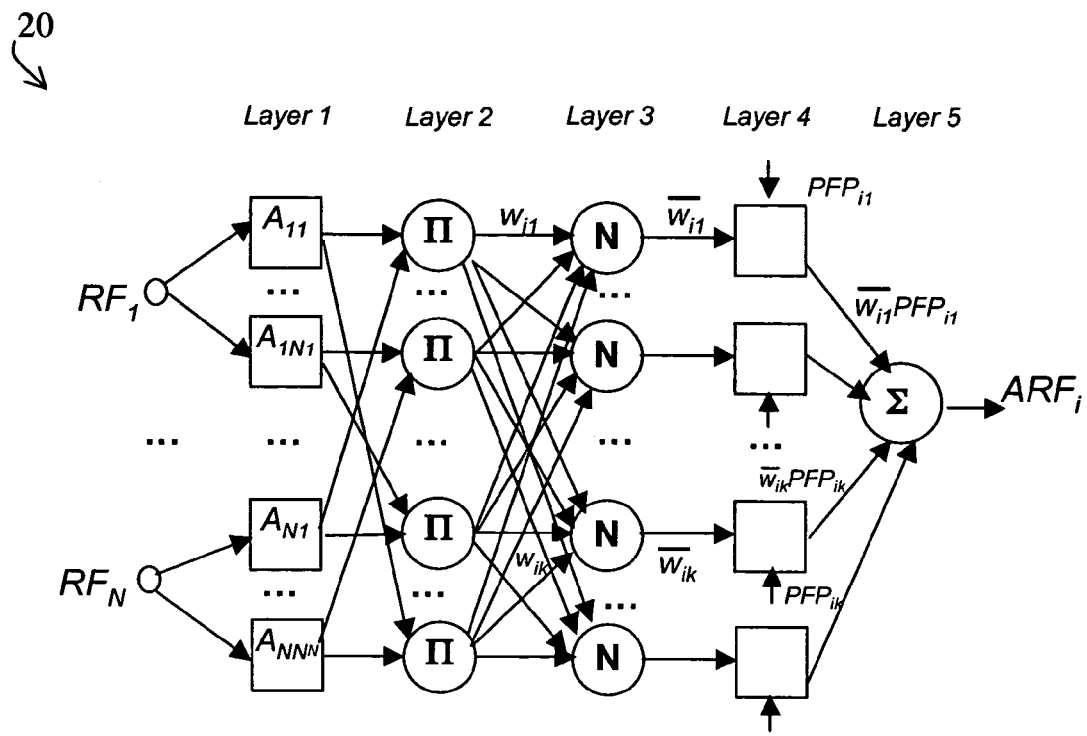
FIG. 2 is a schematic diagram that illustrates the logical structure of the Pre-processing Neuro-Fuzzy Inference System (PNFIS) of FIG. 1.

The logical structure of PNFIS 20 in one embodiment of the invention is depicted schematically in FIG. 2. In one implementation of PNFIS 20, fuzzy rules take the form of:

Fuzzy Rule (i,k): IF ($RF_1$ is $A_{1jik}$) AND ($RF_2$ is $A_{2jik}$) AND ... AND ($RF_N$ is $A_{Njik}$) THEN $ARF_i = PFP_{ik} \cdot RF_i$, i=1, 2, ..., N, k=1, 2, ..., $M_i$ where $M_i$ is the number of fuzzy rules with contributing factor i as the consequent, $PFP_{ik}$ is an adjustable parameter associated with the fuzzy rule (i,k), and $A_{sjik}$ is a fuzzy set associated with the $j_{ik}$-th rating level of factor s for fuzzy rule (,ik).

The form of the fuzzy rules used may differ in variant implementations of PFNIS 20. For example, the fuzzy rules may change depending on the estimation problem being considered, and/or on the specific algorithmic model applied in algorithmic model module 40.

Further details with respect to the processing performed by PNFIS 20 will be discussed with reference to FIG. 5.

NFB 30 is used to calibrate each contributing factor i by mapping the adjusted rating values $ARF_i$ for the respective contributing factor produced by PNFIS 20 into corresponding numerical parameter values $FM_i$, to be used as input for the algorithmic model embodied in algorithmic model module 40. In NFB 30, the i-th element is a neuro-fuzzy subsystem 32 ($NFB_i$), which is associated with contributing factor i. In one embodiment of the invention, each contributing factor is associated with one of several qualitative rating levels, which may be expressed in linguistic terms. For example, the COCOMO II model uses six such rating levels: Very Low (VL), Low (L), Nominal (N), High (H), Very High (VH) and Extra High (XH).

In a software estimation system, each contributing factor and the corresponding rating criteria for each rating level are typically defined. For instance, where "PCAP" denotes the contributing factor of programmers' capability, if rating level "H" has been associated with "PCAP", then the capability of the programmers is considered "high". However, for the algorithmic model used to estimate software output metrics in this embodiment of the invention, a numerical value corresponding to the rating value of each contributing factor, which can be used in a mathematical formula associated with the algorithmic model, needs to be determined. Put another way, for every contributing factor, each rating level needs to relate to a quantitative numerical value, namely a numerical parameter value, for use in the algorithmic model. Accordingly, mappings from adjusted rating values for the contributing factors to numerical parameter values are made by NFB 30.

Figure 3:
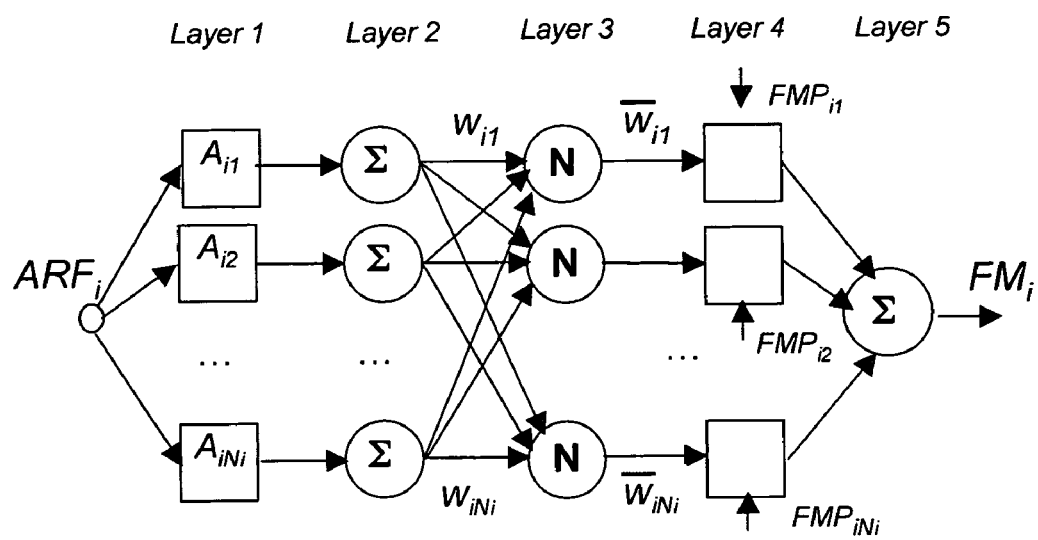
FIG. 3 is a schematic diagram that illustrates the logical structure of the Neuro-Fuzzy Bank (NFB) of FIG. 1.

The logical structure of each $NFB_i$ 32 of NFB 30 in one embodiment of the invention is depicted schematically in FIG. 3. In each $NFB_i$ 32, fuzzy rules take the form of:

Fuzzy Rule (i,k): IF ($ARF_i$ is $A_{ik}$) THEN $FM_i=FMP_{ik}$, i=1, 2, ..., N, k=1, 2, ..., $N_i$ where $N_i$ is the number of rating levels for contributing factor i, $A_{ik}$ is a fuzzy set associated with the k-th rating level of contributing factor i, and $FMP_{ik}$ is an adjustable parameter associated with the k-th rating level of contributing factor i.

The number of elements $NFB_i$ 32 in NFB 30 is equal to the number of contributing factors, and the number of fuzzy rules equals the number of rating levels associated with the corresponding contributing factor. For example, if contributing factor i has six rating levels, each $NFB_i$ 32 is composed of the following six fuzzy if-then rules:

Fuzzy Rule (i,1): IF $ARF_i$ is $A_{i1}$ (Very Low), THEN $FM_i=FMP_{i1}$
Fuzzy Rule (i,2): IF $ARF_i$ is $A_{i2}$ (Low), THEN $FM_i=FMP_{i2}$
Fuzzy Rule (i,3): IF $ARF_i$ is $A_{i3}$ (Nominal), THEN $FM_i=FMP_{i3}$
Fuzzy Rule (i,4): IF $ARF_i$ is $A_{i4}$ (High), THEN $FM_i=FMP_{i4}$
Fuzzy Rule (i,5): IF $ARF_i$ is $A_{i5}$ (Very High), THEN $FM_i=FMP_{i5}$
Fuzzy Rule (i,6): IF $ARF_i$ is $A_{i6}$ (Extra High), THEN $FM_i=FMPi6$ For any particular software estimation problem, once the number of contributing factors are determined and the number of rating levels for each contributing factor is determined, the structure and fuzzy rules of NFB 30 are determined. Only the fuzzy rule parameters (e.g. $PFP_{ik}$, k=1, 2, ..., $M_i$ of FIG. 2, $FMP_{ik}$, k=1, 2, ..., $N_i$ of FIG. 3) need to be fine-tuned by the learning process from numerical project data. Different learning processes and algorithms may be employed for this purpose in variant implementations.

In a variant embodiment of the invention, the fuzzy rules for each $NFB_i$ 32 are subject to a monotonic constraint on the corresponding contributing factor i to ensure that the calibrated results generated by NFB 30 are reasonable, and not counter-intuitive. Monotonic constraints reflect the expert knowledge about the effects of contributing factors on an estimated software output metric. For most contributing factors, when the rating value of a contributing factor goes high, the estimated software output metric should change monotonically; in other words, it should increase or decrease along only one direction. For example, in one implementation of this embodiment, the following monotonic constraints may be applied:

$$FMP_{i1} \leq FMP_{i2} \leq \ldots \leq FMP_{iNi}, i \in I_{INC}(F)$$

$$FMP_{i1} \geq FMP_{i2} \geq \ldots \geq FMP_{iNi}, i \in I_{DEC}(F)$$

where $I_{INC}(F)$ is the index set of increasing contributing factors whose higher rating value corresponds to the higher values of the estimated software output metric, and $I_{DEC}(F)$ is the index set of decreasing contributing factors whose higher rating value corresponds to the lower value of the estimated software output metric. Monotonic constraints may be formulated for other variables and parameters in variant implementations.

The functionality of $NFB_i$ 32 (and similarly, PNFIS 20) can be looked at from two perspectives. From the learning perspective, we can treat it as a neural network, so that we can use available learning algorithms for neural networks to calibrate the corresponding parameters. Therefore, $NFB_i$ 32 has learning capability. From the reasoning perspective, $NFB_i$ 32 can be considered as a fuzzy logic system. Its output is derived using fuzzy if-then rules, and the reasoning process is transparent and is similar to the decision-making process of human beings. Therefore, $NFB_i$ 32 is not a black box. The entire reasoning process is clear to users of the software estimation system, and can be traced and validated by users and experts, thereby making the framework more easily accepted for application in project management.

Further details with respect to the processing performed by each $NFB_i$ 32 will be discussed with reference to FIG. 6 below.

Algorithmic model module 40 performs further processing in software estimation system 10, by computing software output metric(s) $M_o$ from numerical parameter values $FM_i$ generated by NFB 30 and other variables $V_i$, in accordance with a selected algorithmic model. Software estimation system 10 is flexible, in that different algorithmic models can be selected for use in software estimation system 10 in variant implementations of the invention. Depending on the application, the algorithmic model may take a different form.

An algorithmic model can be built by analyzing software output metrics and attributes of completed projects, and used to predict software output metrics based on the attributes of the software development product and development process under consideration. Many algorithmic models have been proposed to estimate different software output metrics, such as software development cost, software maintenance cost, software quality, software development productivity, software size, scheduling, staffing, and defect prediction, for example. Algorithmic model module 40 may be adapted to use any of these known algorithmic models to compute associated software output metric(s). Specific known algorithmic models may include models employed in a Quantitative Software Management (QSM) Software Life cycle Management model (SLIM) tool, models employed in a Software Productivity Research (SPR) KnowledgePLAN® tool, models employed in Computer Associate's CA-Estimacs package, SEER estimating models developed by GA SEER Technologies, and models used in CostXpert tools developed by Cost Xpert Group, Inc., for example.

Another example of an algorithmic model that may be used is the COCOMO II post architecture model, used to predict software development effort, which takes as input the software size and ratings of 22 cost drivers as contributing factors, including five scale factors and 17 effort multipliers. This model takes the form of:

$$\text{Effort} = A \times (\text{Size})^{B+0.01 \times \sum_{i=1}^{5} SF_i} \times \prod_{i=11}^{17} EM_i$$

where A and B are constants, Size refers to the size of software product, scale factors $SF_i$ and effort multipliers $EM_i$ are software product, platform, personnel, and project attributes. In one implementation of an embodiment of the invention, the value of Effort computed upon applying this algorithmic model would be provided as a software output metric (e.g. as an output metric $M_o$ of software estimation system 10 of FIG. 1).

Figure 4:
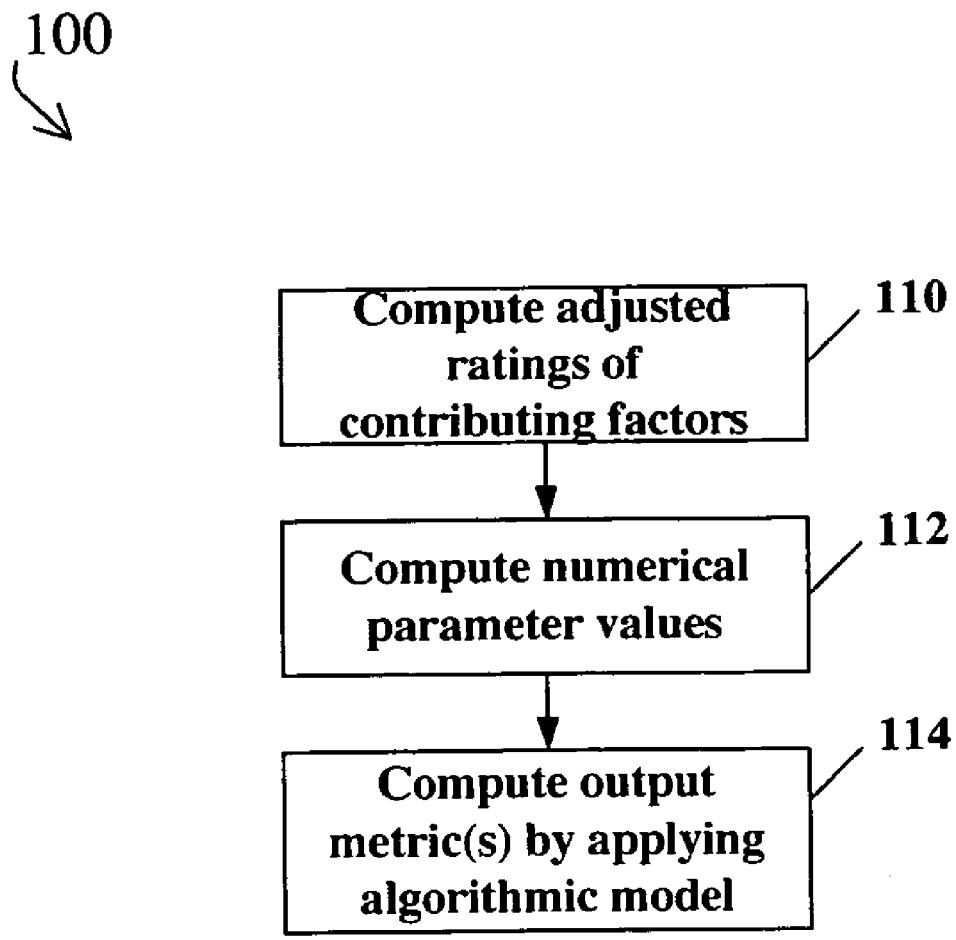
FIG. 4 is a flowchart illustrating the steps in a software estimation method in an embodiment of the invention.

Referring now to FIG. 4, a flowchart illustrating the steps in a software estimation method in an embodiment of the invention is shown generally as 100. In this embodiment, method 100 is computer-implemented, wherein the steps of method 100 are implemented in software instructions of a computing application for execution by computer.

At step 110, adjusted ratings of contributing factors are computed by a pre-processing neuro-fuzzy inference system (e.g. PNFIS 20 of FIG. 1). At step 112, the adjusted ratings computed at step 110 are used by a neuro-fuzzy bank (e.g. NFB 30 of FIG. 1) to compute numerical parameter values for the algorithmic model to be employed (e.g. as implemented by algorithmic model module 40 of FIG. 1). At step 114, an algorithmic model (e.g. COCOMO) is applied in computing at least one output metric from the numerical parameter values computed at step 112. Steps 110 and 112 of method 100 will now be described in further detail with reference to FIGS. 5 and 6.

Figure 5:
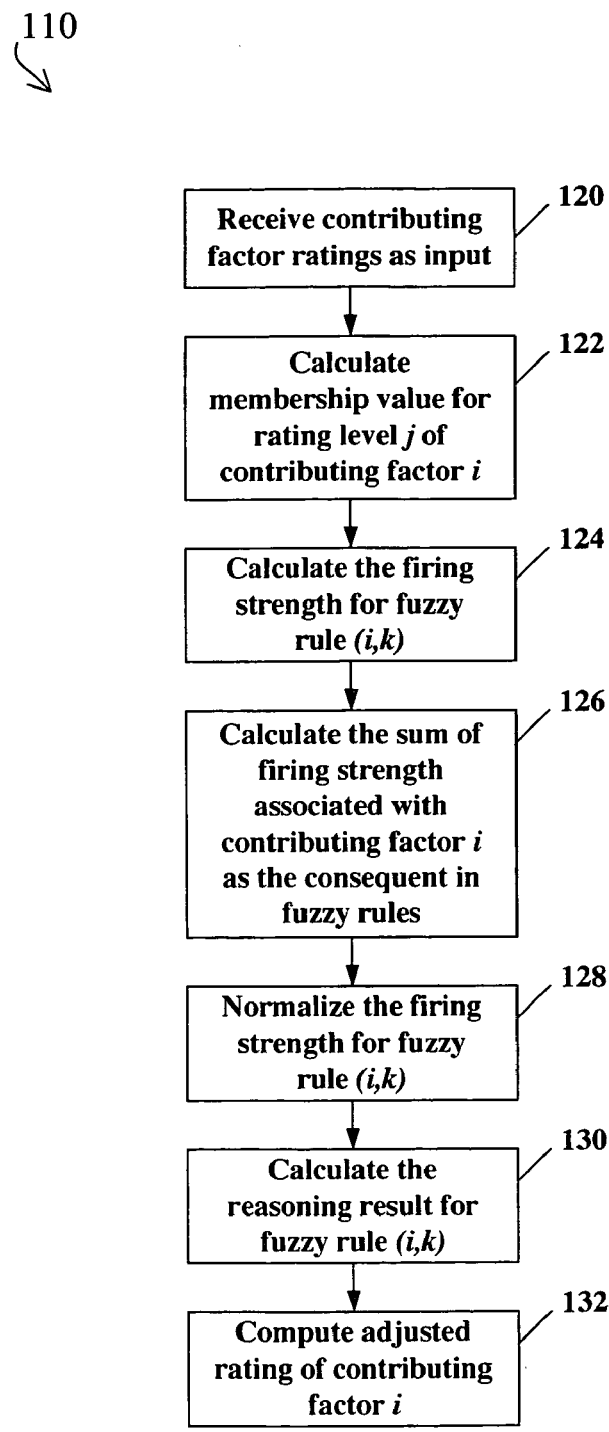
FIG. 5 is a flowchart illustrating the steps in a method of computing adjusted ratings of contributing factors performed by the PNFIS of FIG. 1.

Referring now to FIG. 5, a flowchart illustrating the steps in a method of computing adjusted ratings of contributing factors performed by the PNFIS of FIG. 1 is shown. This method corresponds to step 110 of FIG. 4.

The structure of the PNFIS used in this embodiment of the invention was depicted schematically in FIG. 2. The function of the PNFIS can be described by layer as follows.

First, at step 120, contributing factor ratings $RF_i$, i=1, 2, ..., N, where N is the total number of contributing factors, are received as input to be processed.

With respect to the first layer, at step 122 (layer 1), the membership value for rating level j of contributing factor i is calculated. The activation function of a node in this layer is defined as the corresponding membership function:

$$O_{ij}^1 = \mu_{ij}(RF_i), i=1, 2, \ldots, N, j=1, 2, \ldots, N_i$$

where $N_i$ is the number of rating levels for contributing factor i, $RF_i$ is the rating of contributing factor i, and $\mu_{ij}(RF_i)$ is the membership function of a fuzzy set $A_{ij}$ associated with the j-th rating level of factor i.

In a variant embodiment of the invention, the membership function may be a triangular function. Other membership functions may be employed in variant embodiments.

With respect to the second layer, at step 124 (layer 2), the firing strength $W_{ik}$ for fuzzy rule (i,k) is calculated. The inputs are the membership values in the premise of the fuzzy rule. The output is the product of all input membership values, which is called the firing strength of the corresponding fuzzy rule. The firing strength can be calculated as follows:

$$w_{ik} = \prod_{s=1}^{N} O_{sj_{ik}}^1, i = 1, 2, L, N, k = 1, 2, L, M_i$$

where $M_i$ is the number of fuzzy rules with contributing factor i as the consequent.

Moreover, at step 126, the sum of firing strength $S_{iw}$ associated with contributing factor i as the consequent in all fuzzy rules within the PNFIS is then calculated:

$$S_{iw} = \sum_{k=1}^{M_i} w_{ik}, i = 1, 2, \ldots, N$$

With respect to the third layer, at step 128, the firing strength for fuzzy rule (i,k) is normalized. The output of the k-th node is called the normalized firing strength, which is defined as follows:

$$\overline{w}_{ik} = \frac{w_{ik}}{S_{iw}}, i = 1, 2, \ldots, N, k = 1, 2, \ldots, M_i$$

With respect to the fourth layer, at step 130, the reasoning result for fuzzy rule (i,k) is calculated as follows:

$$O_{ik}^4 = \overline{w}_{ik} \cdot PFP_{ik} \cdot RF_i, i=1, 2, \ldots, N, k=1, 2, \ldots, M_i$$

where $PFP_{ik}$ is an adjustable parameter associated with fuzzy rule (i,k). This adjustable parameter may be obtained initially from an algorithmic model or based on expert knowledge. It can subsequently be changed by learning.

With respect to the fifth layer, at step 132, all reasoning results calculated at step 130 are summed as follows to obtain adjusted rating values for contributing factor i:

$$ARF_i = \sum_{k=1}^{M_i} O_{ik}^4, i = 1, 2, \ldots, N$$

In summary, the overall output of the PNFIS, namely the i-th adjusted contributing factor rating can be defined as follows:

$$ARF_i = \sum_{k=1}^{M_i} \left( \frac{\prod_{s=1}^{N} \mu_{sj_{ik}}(RF_s)}{\sum_{j=1}^{M_i} \left( \prod_{s=1}^{N} \mu_{sj_{ij}}(RF_s) \right)} \cdot PFP_{ik} \cdot RF_i \right), i = 1, 2, \ldots, N$$

Figure 6:
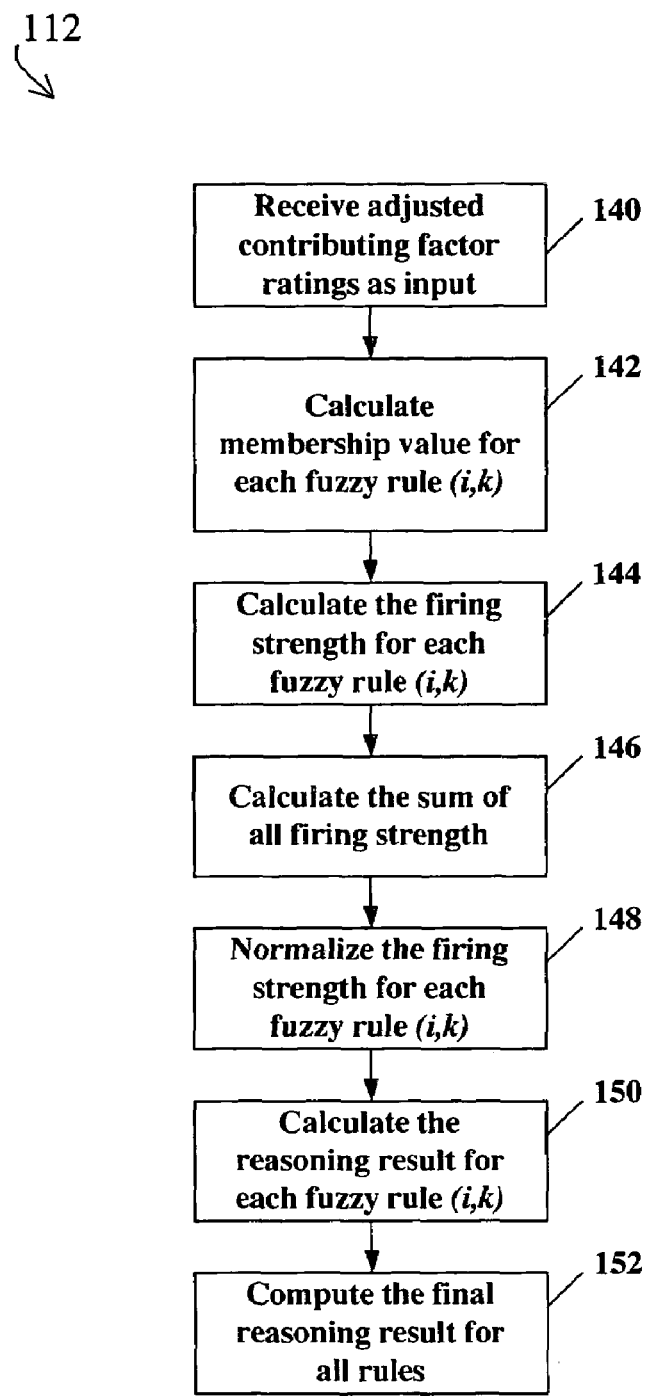
FIG. 6 is a flowchart illustrating the steps in a method of computing numerical parameter values for use in an algorithmic model performed by elements of the NFB of FIG. 1.

Referring to FIG. 6, a flowchart illustrating the steps in a method of computing numerical parameter values for use in an algorithmic model performed by elements of the NFB of FIG. 1 is shown. This method corresponds to step 112 of FIG. 4.

The structure of each subsystem of the NFB used in this embodiment of the invention is depicted schematically in FIG. 3. The function of the $NFB_i$ can be described by layer as follows.

First, at step 140, adjusted contributing factor ratings $ARF_i$, i=1, 2, ..., N, where N is the total number of contributing factors, are received as input to be processed.

With respect to the first layer, at step 142 (layer 1), the membership value for each fuzzy rule (i,k) is calculated. The activation function of a node in this layer is defined as the corresponding membership function:

$$O_{ik}^1 = \mu_{ik}(ARF_i), k=1, 2, \ldots, N_i$$

where $N_i$ is the number of rating levels for contributing factor i, $ARF_i$ is the adjusted rating value of contributing factor i, and $\mu_{ik}(ARF_i)$ is the membership function of a fuzzy set $A_{ik}$ associated with the k-th rating level of contributing factor i.

In this embodiment, the membership function is the same as that described with reference to FIG. 5. In a variant embodiment of the invention, the membership function may be a triangular function. Other membership functions may be employed in variant embodiments.

With respect to the second layer, at step 144 (layer 2), the firing strength $W_{ik}$ for each fuzzy rule (i,k) is calculated. The inputs are the membership values in the premise of the fuzzy rule. The output is the product of all input membership values, which is called the firing strength of the corresponding fuzzy rule. In this case, because there is only one condition in the premise of each fuzzy rule, the firing strength is the same as the membership value obtained in layer 1, namely:

$$w_{ik} = O_{ik}^1$$

Moreover, at step 146, the sum of firing strength $S_{iw}$ associated with contributing factor i as the consequent in the $N_i$ fuzzy rules for contributing factor i is then calculated:

$$S_{iw} = \sum_{j=1}^{N_i} w_{ij}$$

With respect to the third layer, at step 148, the firing strength for each fuzzy rule is normalized. The output of the k-th node is called the normalized firing strength, which is defined as follows:

$$\overline{w}_{ik} = \frac{w_{ik}}{S_{iw}}, k = 1, 2, \ldots, N_i$$

With respect to the fourth layer, at step 150, the reasoning result of a fuzzy rule is calculated as follows:

$$O_{ik}^4 = \overline{w}_{ik} FMP_{ik}$$

where $FMP_{ik}$ is an adjustable parameter associated with the k-th rating level of contributing factor i. This adjustable parameter may be obtained initially from an algorithmic model or based on expert knowledge. It can subsequently be changed by learning.

With respect to the fifth layer, at step 152, all reasoning results calculated at step 150 are summed as follows, to obtain numerical parameter values to be further processed by the algorithmic model:

$$FM_i = \sum_{k=1}^{N_i} O_{ik}^4$$

In summary, the overall output of the i-th element $NFB_i$ in the NFB is:

$$FM_i = \sum_{k=1}^{N_i} \overline{w}_{ik} FMP_{ik} = \sum_{k=1}^{N_i} \frac{\mu_{ik}(ARF_i)}{\sum_{j=1}^{N_i} \mu_{ij}(ARF_i)} \cdot FMP_{ik}, i = 1, 2, \ldots, N$$

Industrial project data was used to validate an implementation of an embodiment of the invention. For example, one case study utilized data from 69 projects. The results of the study as summarized in Table 1 below illustrate that the software estimation system in this embodiment of the invention facilitated a significant improvement in cost estimation accuracy as compared to a standard COCOMO model.

TABLE 1

Cost Estimation for 69 Project Data Points

| | COCOMO Model | An implementation of an embodiment of the Software Estimation System | | | | | |
|---|---|---|---|---|---|---|---|
| | | Case I | | Case II | | Case III | |
| ARE | PERC | PERC | IMPRV | PERC | IMPRV | PERC | IMPRV |
| 20% | 71% | 86% | 15% | 88% | 17% | 88% | 17% |
| 30% | 81% | 92% | 11% | 92% | 11% | 92% | 11% |

ARE—absolute relative error
PERC—percent of projects
IMPRV—improvement provided by the implementation of an embodiment of the software estimation system over COCOMO
Case I. Learning with all project data
Case II. Learning with part of project data
Case III. Use larger weights for local project data It will be understood by persons skilled in the art that the software estimation systems and methods described herein may be applied to a variety of software estimation applications, as well as other types of estimation more generally (e.g. predicting stock performance, predicting the medical condition of patients). Applications of the framework may also be extended to applications in a wide variety of industries, including aerospace applications, communication systems applications, consumer appliance applications, electric power systems applications, manufacturing automation and robotics applications, power electronics and motion control applications, industrial process engineering applications, and transportation applications, for example.

Furthermore, in variant implementations, an embodiment of the invention may be employed as an element in a larger framework, working in conjunction with other systems, models, or tools to produce output metrics.

It will be understood by persons skilled in the art that the specific configuration of the PNFIS and NFB described in the foregoing description is provided by way of example only, and that other configurations may be employed without departing from the scope of the invention. For example, in variant embodiments of the invention, each of the PNFIS and NFB may have a fewer further example, in variant embodiments of the invention, the functions of the PNFIS and NFB may be merged in a particular module or component.

The steps of the methods described herein with respect to one or more embodiments of the invention may be provided as executable software instructions stored on computer-readable media, which may include transmission-type media.

The invention has been described with regard to a number of embodiments. However, it will be understood by persons skilled in the art that other variants and modifications may be made without departing from the scope of the invention as defined in the claims appended hereto.

The invention claimed is:

1. A computer-implemented software estimation system for use in software engineering, comprising a processor and a memory for storing components comprising:
   a) at least one neuro-fuzzy component, wherein each neuro-fuzzy component has the learning capability of a neural network and implements a plurality of fuzzy rules, wherein said at least one neuro-fuzzy component takes as input a plurality of contributing factor ratings and processes said contributing factor ratings in accordance with said fuzzy rules to compute numerical parameter values for an algorithmic model, and wherein said at least one neuro-fuzzy component comprises:
      i) a neuro-fuzzy inference system for resolving the effect of dependencies among a plurality of contributing factors associated with said plurality of contributing factor ratings, wherein said neuro-fuzzy inference system implements a first subset of said plurality of fuzzy rules, and wherein said neuro-fuzzy inference system takes as input said plurality of contributing factor ratings and processes each of said plurality of contributing factor ratings in accordance with said first subset to compute a plurality of adjusted ratings; and
      ii) a neuro-fuzzy bank coupled to said neuro-fuzzy inference system, wherein said neuro-fuzzy bank implements a second subset of said plurality of fuzzy rules, and wherein said neuro-fuzzy bank takes as input said plurality of adjusted ratings and processes each of said plurality of adjusted ratings in accordance with said second subset to compute said numerical parameter values; and
   b) an algorithmic model module coupled to said at least one neuro-fuzzy component, wherein said module takes as input said numerical parameter values and processes said numerical parameter values in accordance with said algorithmic model to compute at least one output metric; wherein each output metric provides an estimate of a characteristic associated with a software development project, said at least one output metric for use in analyzing the feasibility of the software development project;
   wherein said first subset of said plurality of fuzzy rules is defined by
Fuzzy Rule (i,k): IF ($RF_1$ is $A_{1jik}$) AND ($RF_2$ is $A_{2jik}$) AND ... AND ($RF_N$ is $A_{Njik}$) THEN $ARF_i = PFP_{ik} \cdot RF_i$, $i=1, 2, \ldots, N$, $k=1,2, \ldots, M_i$
where $RF_i$, is a rating of contributing factor i, $ARF_i$, is an adjusted rating of contributing factor i, $M_i$, is a number of fuzzy rules with contributing factor i as a consequent, $PFP_{ik}$ is an adjustable parameter associated with the fuzzy rule (i,k), and $A_{sjik}$, is a fuzzy set associated with a $i_{ik}$-th rating level of contributing factor s for fuzzy rule (i,k);

wherein said plurality of adjusted ratings computed by said neuro-fuzzy inference system satisfy:

$$ARF_i = \sum_{k=1}^{M_i} \left( \frac{\prod_{s=1}^{N} \mu_{sj_{ik}}(RF_s)}{\sum_{j=1}^{M_i} \left( \prod_{s=1}^{N} \mu_{sj_{ij}}(RF_s) \right)} \cdot PFP_{ik} \cdot RF_i \right), i = 1, 2, \ldots, N$$

where $ARF_i$, is the adjusted rating of contributing factor i, $RF_i$, is the rating of contributing factor i, $PFP_{ik}$ is the adjustable parameter associated with the fuzzy rule (i,k), and $\mu_{sjik}(RF_s)$ is a membership function of the fuzzy set $A_{sjik}$ associated with the $i_{ik}$-th rating level of contributing factor s;

wherein said second subset of said plurality of fuzzy rules is defined by
Fuzzy Rule (i,k): IF ($ARF_i$ is $A_{jk}$) THEN $FM_i = FMP_{ik}$, $i=1, 2, \ldots N$, $k=1,2, \ldots, N_i$
where $ARF_i$ is the adjusted rating of contributing factor i, $FM_j$ is a numerical parameter value for contributing factor i, $N_i$ is a number of rating levels for contributing factor i, $A_{jk}$ is a fuzzy set associated with a k-th rating level of contributing factor i, and $FMP_{ik}$ is an adjustable parameter associated with the k-th rating level of contributing factor i; and wherein said plurality of numerical parameter values computed by said neuro-fuzzy bank satisfy:

$$FM_i = \sum_{k=1}^{N_i} \frac{\mu_{ik}(ARF_i)}{\sum_{j=1}^{N_i} \mu_{ij}(ARF_i)} \cdot FMP_{ik}, i = 1, 2, \ldots, N$$

where $FM_i$ is the numerical parameter value for contributing factor i, $ARF_i$ is the adjusted rating of contributing factor i, $FMP_{ik}$ is a corresponding parameter value associated with the k-th rating level of contributing factor i, and $\mu_{ik}(ARF_i)$ is a membership function of the fuzzy set $A_{ik}$ associated with the k-th rating level of contributing factor i.

2. The software estimation system of claim 1, wherein said membership function of the fuzzy set $A_{sjik}$ is a triangular membership function.

3. The software estimation system of claim 1, wherein said membership function of the fuzzy set $A_{ik}$ is a triangular membership function.

4. The software estimation system of claim 1, wherein said numerical parameter values are subject to the following monotonic constraints:

$$FMP_{i1} \leq FMP_{i2} \leq \ldots \leq FMP_{iN_i}, i \in I_{INC}(F)$$

$$FMP_{i1} \geq FMP_{i2} \geq \ldots \geq FMP_{iN_i}, i \in I_{DEC}(F)$$

where $I_{INC}(F)$ is the index set of increasing contributing factors whose higher rating value corresponds to the higher values of said at least one output metric, and $I_{DEC}(F)$ is the index set of decreasing contributing factors whose higher rating value corresponds to the lower value of said at least one output metric.

5. The software estimation system of claim 1, wherein said algorithmic model is the constructive cost model COCOMO.

6. The software estimation system of claim 5, wherein said at least one output metric is an estimate of development effort associated with said software development project.

7. The software estimation system of claim 1, wherein each of said at least one output metric is an estimate of one of the elements selected from the following group: software development cost, software maintenance cost, software quality, software development productivity, software size, scheduling, staffing, and defect prediction.

8. A software estimation method comprising the steps of:
   a) computing numerical parameter values for an algorithmic model in at least one neuro-fuzzy component, wherein each neuro-fuzzy component has the learning capability of a neural network and implements a plurality of fuzzy rules, wherein said at least one neuro-fuzzy component takes as input a plurality of contributing factor ratings and processes said contributing factor ratings in accordance with said fuzzy rules, and wherein said at least one neuro-fuzzy component comprises:
      i) a neuro-fuzzy inference system for resolving the effect of dependencies among a plurality of contributing factors associated with said plurality of contributing factor ratings, wherein said neuro-fuzzy inference system implements a first subset of said plurality of fuzzy rules, and wherein said neuro-fuzzy inference system takes as input said plurality of contributing factor ratings and processes each of said plurality of contributing factor ratings in accordance with said first subset to compute a plurality of adjusted ratings; and
      ii) a neuro-fuzzy bank coupled to said neuro-fuzzy inference system, wherein said neuro-fuzzy bank implements a second subset of said plurality of fuzzy rules, and wherein said neuro-fuzzy bank takes as input said plurality of adjusted ratings and processes each of said plurality of adjusted ratings in accordance with said second subset to compute said numerical parameter values; and
   b) computing at least one output metric in an algorithmic model module, wherein said module takes as input said numerical parameter values and processes said numerical parameter values in accordance with said algorithmic model, and wherein each output metric provides an estimate of a characteristic associated with a software development project, said at least one output metric for use in analyzing the feasibility of the software development projects;
   wherein said first subset of said plurality of fuzzy rules is defined by Fuzzy Rule (i,k): IF ($RF_1$ is $A_{1jik}$) AND ($RF_2$ is $A_{2jik}$) AND ... AND ($RE_N$ is $A_{Njik}$) THEN $ARF_i = PFP_k \cdot RF_i$, i = 1, 2, ... N, k = 1, 2, ..., $M_i$ where $RF_i$ is a rating of contributing factor i, $ARF_i$ is an adjusted rating of contributing factor i, $M_i$ is a number of fuzzy rules with contributing factor i as a consequent, $PEP_{ik}$ is an adjustable parameter associated with the fuzzy rule (i,k), and $A_{sjik}$ is a fuzzy set associated with a $i_{ik}$-th rating level of contributing factor s for fuzzy rule (i,k);

wherein said plurality of adjusted ratings computed by said neuro-fuzzy inference system satisfy:

$$ARF_i = \sum_{k=1}^{M_i} \left( \frac{\prod_{s=1}^{N} \mu_{sjik}(RF_s)}{\sum_{j=1}^{M_i} \left( \prod_{s=1}^{N} \mu_{sjij}(RF_s) \right)} \cdot PFP_{ik} \cdot RF_i \right), i = 1, 2, \ldots, N$$

where $ARF_i$ is the adjusted rating of contributing factor i, $RF_i$ is the rating of contributing factor i, $PFP_{ik}$ is the adjustable parameter associated with the fuzzy rule (i,k), and $\mu_{sjik}(RF_s)$ is a membership function of the fuzzy set $A_{sjik}$ associated with the $i_{ik}$-th rating level of contributing factor s;

wherein said second subset of said plurality of fuzzy rules is defined by

Fuzzy Rule (i,k): IF ($ARF_i$ is $A_{ik}$) THEN $FM_i = FMP_{ik}$, i = 1, 2, ... N, k = 1, 2, ..., $N_i$ where $ARF_i$ is the adjusted rating of contributing factor i, $FM_i$ is a numerical parameter value for contributing factor i, $N_i$ is a number of rating levels for contributing factor i, $A_{ik}$ is a fuzzy set associated with a k-th rating level of contributing factor i, and $FMP_{ik}$ is an adjustable parameter associated with the k-th rating level of contributing factor i; and wherein said plurality of numerical parameter values computed by said neuro-fuzzy bank satisfy:

$$FM_i = \sum_{k=1}^{N_i} \frac{\mu_{ik}(ARF_i)}{\sum_{j=1}^{N_i} \mu_{ij}(ARF_i)} \cdot FMP_{ik}, i = 1, 2, \ldots, N$$

where $FM_i$ is the numerical parameter value for contributing factor i, $ARF_i$ is the adjusted rating of contributing factor i, $FMP_{ik}$ is a corresponding parameter value associated with the k-th rating level of contributing factor i, and $\mu_{jk}(ARF_i)$ is a membership function of the fuzzy set $A_{ik}$ associated with the k-th rating level of contributing factor i.

9. The software estimation method of claim 8, wherein said membership function of the fuzzy set $A_{sjik}$ is a triangular membership function.

10. The software estimation method of claim 8, wherein said membership function of the fuzzy set $A_{jk}$ is a triangular membership function.

11. The software estimation method of claim 8, wherein said numerical parameter values are subject to the following monotonic constraints:

$FMP_{i1} \leq FMP_{i2} \leq \ldots \leq FMP_{iN_i}, i \in I_{INC}(F)$ $FMP_{i1} \geq FMP_{i2} \geq \ldots \geq FMP_{iN_i}, i \in I_{DEC}(F)$ where $I_{INC}(F)$ is the index set of increasing contributing factors whose higher rating value corresponds to the higher values of said at least one output metric, and $I_{DEC}(F)$ is the index set of decreasing contributing factors whose higher rating value corresponds to the lower value of said at least one output metric.

12. The software estimation method of claim 8, wherein said algorithmic model is the constructive cost model COCOMO.

13. The software estimation method of claim 12, wherein said at least one output metric is an estimate of development effort associated with said software development project.

14. The software estimation method of claim 8, wherein each of said at least one output metric is an estimate of one of the elements selected from the following group: software development cost, software maintenance cost, software quality, software development productivity, software size, scheduling, staffing, and defect prediction.

* * * * *